(12) United States Patent
Elliston et al.

(10) Patent No.: US 9,248,518 B2
(45) Date of Patent: Feb. 2, 2016

(54) SAW BLADE TOOTH FORM FOR ABUSIVE CUTTING APPLICATIONS

(75) Inventors: Asif Elliston, Springfield, MA (US); William B. Korb, Broad Brook, CT (US); Stephen A. Hampton, East Longmeadow, MA (US)

(73) Assignee: Irwin Industrial Tool Company, Huntersville, NC (US)

( * ) Notice: Subject to any disclaimer, the term of this patent is extended or adjusted under 35 U.S.C. 154(b) by 269 days.

(21) Appl. No.: 12/827,658

(22) Filed: Jun. 30, 2010

(65) Prior Publication Data

US 2012/0000338 A1 Jan. 5, 2012

(51) Int. Cl.
*B23D 61/12* (2006.01)
*B27B 33/02* (2006.01)
*B23B 51/04* (2006.01)

(52) U.S. Cl.
CPC .......... *B23D 61/121* (2013.01); *B23B 51/0406* (2013.01); *B27B 33/02* (2013.01); *B23B 2251/14* (2013.01); *B23B 2251/28* (2013.01); *Y10T 83/935* (2015.04); *Y10T 83/9358* (2015.04); *Y10T 83/9454* (2015.04)

(58) Field of Classification Search
CPC .................................................... B23D 53/12
USPC .............. 30/380; 83/810–812, 820, 835–855, 83/661
IPC ........................................ B23D 61/021, 61/121
See application file for complete search history.

(56) References Cited

U.S. PATENT DOCUMENTS

| | | | |
|---|---|---|---|
| 521,343 A | 6/1894 | Hazard | |
| 603,128 A | 4/1898 | Clemson | |
| 820,969 A | 5/1906 | Grelck | |
| 1,181,529 A | 5/1916 | Hutton | |
| 1,381,930 A | 6/1921 | Morgan | |
| 1,453,335 A * | 5/1923 | Bennett | 30/380 |
| 2,126,382 A | 8/1938 | Goff et al. | |

(Continued)

FOREIGN PATENT DOCUMENTS

| | | |
|---|---|---|
| CH | 691438 A5 | 7/2001 |
| DE | 19501019 B4 | 11/2005 |
| FR | 2729321 B1 | 10/1999 |

OTHER PUBLICATIONS

International Search Report and Written Opinion of the International Searching Authority for International Application No. PCT/US2011/042681.

*Primary Examiner* — Kenneth E Peterson

(74) *Attorney, Agent, or Firm* — Sutherland Asbill & Brennan LLP

(57) ABSTRACT

A recip saw blade has a blade body and a cutting edge extending along the blade body and defined by a repeating pattern of two consecutive teeth suitable for abusive cutting applications. The two consecutive teeth, which may be bi-metal, include a high tooth and a relatively low tooth in comparison to the high tooth. Each high tooth and low tooth include a primary clearance surface defining a relatively shallow primary clearance angle that is about 28° or less, and a secondary clearance surface defining a relatively steep secondary clearance angle in comparison to the primary clearance angle. The primary clearance angle of the high tooth is steeper than the primary clearance angle of the low tooth, such as between about 23° and 28°, and the secondary clearance angle of the high tooth is shallower than the secondary clearance angle of the low tooth.

36 Claims, 4 Drawing Sheets

(56) References Cited

U.S. PATENT DOCUMENTS

| | | | |
|---|---|---|---|
| 2,227,864 A | 1/1941 | Ronan | |
| 2,241,703 A | 5/1941 | Gommel | |
| 2,394,035 A | 2/1946 | Blum | |
| 2,534,424 A | 12/1950 | Dryden | |
| 2,568,870 A | 9/1951 | Ronan | |
| 2,593,760 A * | 4/1952 | James | 30/371 |
| 2,635,327 A | 4/1953 | Enlow | |
| 2,637,355 A | 5/1953 | Chapin | |
| 2,682,098 A | 6/1954 | Wilcox | |
| 2,722,953 A * | 11/1955 | Lee | 30/373 |
| 3,171,457 A | 3/1965 | Brown | |
| 3,309,756 A | 10/1965 | Segal | |
| 3,292,674 A | 12/1966 | Turner | |
| 3,576,061 A | 4/1971 | Pahlitzsch | |
| 3,576,200 A | 4/1971 | Elmes | |
| 3,651,841 A | 3/1972 | Ohlsson | |
| 3,661,037 A | 5/1972 | Athanasoulas | |
| 3,712,348 A | 1/1973 | Kulik et al. | |
| 4,001,937 A * | 1/1977 | Stelljes et al. | 30/380 |
| 4,179,967 A | 12/1979 | Clark | |
| 4,232,578 A | 11/1980 | Stellinger et al. | |
| 4,292,871 A | 10/1981 | Neumeyer et al. | |
| RE31,433 E | 11/1983 | Clark | |
| 4,557,172 A | 12/1985 | Yoneda | |
| 4,587,876 A | 5/1986 | Erhardt | |
| 4,688,458 A | 8/1987 | Krilov | |
| 4,727,788 A | 3/1988 | Yoshida et al. | |
| 4,784,033 A | 11/1988 | Hayden et al. | |
| 4,784,034 A | 11/1988 | Stones et al. | |
| 4,798,001 A | 1/1989 | Grossmann et al. | |
| 4,802,396 A | 2/1989 | Kuklinski | |
| 4,813,324 A | 3/1989 | Yoshida et al. | |
| 4,827,822 A | 5/1989 | Yoshida et al. | |
| 4,913,022 A | 4/1990 | Kuklinski | |
| 4,958,546 A | 9/1990 | Yoshida et al. | |
| 5,018,421 A | 5/1991 | Lucki et al. | |
| 5,094,135 A | 3/1992 | Nakahara et al. | |
| 5,331,876 A | 7/1994 | Hayden | |
| 5,340,129 A | 8/1994 | Wright | |
| 5,410,935 A | 5/1995 | Holston et al. | |
| 5,425,296 A | 6/1995 | Kullmann et al. | |
| 5,433,457 A | 7/1995 | Wright | |
| 5,477,763 A | 12/1995 | Kullman | |
| 5,501,129 A | 3/1996 | Armstrong et al. | |
| 5,603,252 A | 2/1997 | Hayden | |
| 5,606,900 A | 3/1997 | Stoddard | |
| 5,697,280 A | 12/1997 | Armstrong et al. | |
| 5,832,803 A | 11/1998 | Hayden | |
| 5,848,473 A | 12/1998 | Brandenburg | |
| 5,868,058 A | 2/1999 | Senegas | |
| 6,003,422 A | 12/1999 | Holston | |
| 6,119,571 A | 9/2000 | Hayden | |
| 6,145,426 A | 11/2000 | Ward et al. | |
| 6,158,324 A | 12/2000 | Kullmann et al. | |
| 6,167,792 B1 | 1/2001 | Korb et al. | |
| 6,178,646 B1 | 1/2001 | Schnell et al. | |
| 6,220,139 B1 | 4/2001 | Kobayashi et al. | |
| 6,220,140 B1 | 4/2001 | Hellebergh | |
| 6,230,411 B1 | 5/2001 | Wall et al. | |
| 6,244,152 B1 | 6/2001 | Di Nicolantonio | |
| 6,257,226 B1 | 7/2001 | Hayden | |
| 6,269,722 B1 | 8/2001 | Hellbergh | |
| 6,276,248 B1 | 8/2001 | Cranna | |
| 6,276,249 B1 | 8/2001 | Handschuh et al. | |
| 6,357,124 B1 | 3/2002 | Wall et al. | |
| 6,363,827 B1 | 4/2002 | Osing et al. | |
| 6,439,094 B1 | 8/2002 | Toneda et al. | |
| 6,520,722 B2 | 2/2003 | Hopper et al. | |
| 6,532,852 B1 | 3/2003 | Tsujimoto et al. | |
| 6,598,509 B2 | 7/2003 | Cook et al. | |
| 6,601,495 B2 | 8/2003 | Cranna | |
| 6,834,573 B1 | 12/2004 | Nakahara | |
| 7,036,415 B2 | 5/2006 | Tsujimoto | |
| 7,036,417 B2 | 5/2006 | Alton | |
| 7,131,365 B2 | 11/2006 | Hall et al. | |
| 7,174,823 B2 | 2/2007 | Cranna | |
| 7,225,714 B2 | 6/2007 | Rompel et al. | |
| 2001/0004860 A1 | 6/2001 | Kullmann et al. | |
| 2001/0015120 A1 | 8/2001 | Hickey | |
| 2002/0050196 A1 | 5/2002 | Fluhrer et al. | |
| 2003/0010179 A1 | 1/2003 | McLuen | |
| 2003/0051593 A1 | 3/2003 | Kocher et al. | |
| 2003/0121391 A1 | 7/2003 | Knebel | |
| 2004/0035282 A1 | 2/2004 | Tsujimoto | |
| 2004/0050234 A1 | 3/2004 | Fluhrer et al. | |
| 2004/0158996 A1 * | 8/2004 | McIntosh | 30/380 |
| 2004/0182218 A1 | 9/2004 | Chao | |
| 2004/0255740 A1 | 12/2004 | Troyer | |
| 2004/0255749 A1 | 12/2004 | Hayden, Sr. | |
| 2005/0028664 A1 | 2/2005 | Terada et al. | |
| 2005/0188550 A1 * | 9/2005 | Uehlein-Proctor et al. | 30/380 |
| 2005/0211046 A1 | 9/2005 | Thomas et al. | |
| 2005/0257660 A1 | 11/2005 | Hayden | |
| 2006/0065098 A1 | 3/2006 | Cranna | |
| 2006/0130628 A1 | 6/2006 | Rompel et al. | |
| 2006/0130629 A1 | 6/2006 | Rompel et al. | |
| 2006/0162526 A1 | 7/2006 | Nagano et al. | |
| 2007/0193427 A1 | 8/2007 | Hayden, Sr. | |
| 2007/0199416 A1 | 8/2007 | Cook et al. | |
| 2007/0214922 A1 | 9/2007 | Cook et al. | |
| 2007/0251372 A1 | 11/2007 | Petts et al. | |
| 2008/0121084 A1 | 5/2008 | Vogel et al. | |
| 2008/0271327 A1 * | 11/2008 | Glynn | 30/509 |
| 2008/0307936 A1 | 12/2008 | Elliston et al. | |
| 2009/0145280 A1 | 6/2009 | Bucks et al. | |

* cited by examiner

Prior Art

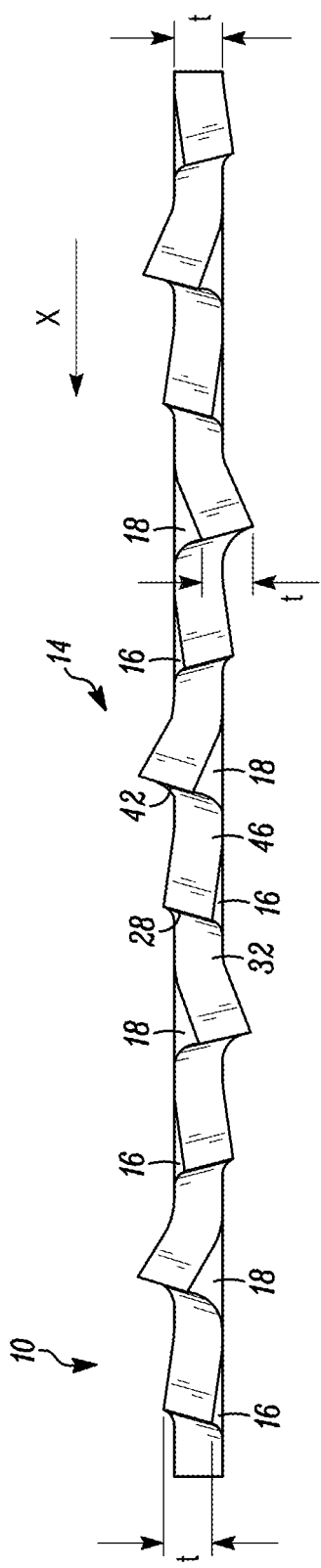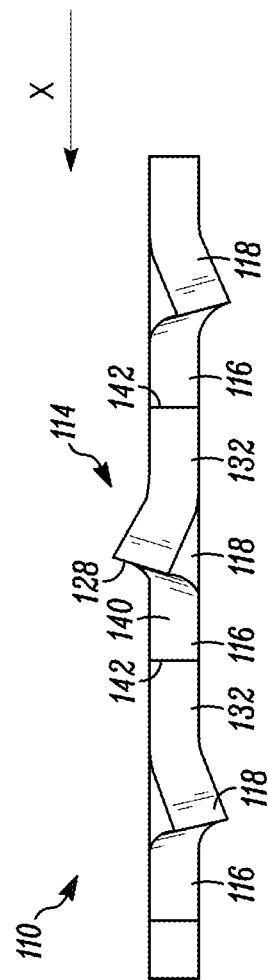
FIG. 3
FIG. 4

SAW BLADE TOOTH FORM FOR ABUSIVE CUTTING APPLICATIONS

FIELD OF THE INVENTION

The present invention relates to saw blades, and more particularly, to saw blades, such as reciprocating saw or recip blades, with tooth forms suited for abusive cutting applications.

BACKGROUND INFORMATION

A reciprocating saw machine is a power saw that includes a chuck for releasably engaging the saw blade and driving the saw blade in a reciprocating motion through a work piece. The reciprocating motion can be an orbital cutting action, a straight or linear cutting action, or an angled cutting action. The length or stroke of the reciprocating motion is typically about 1½ inches or less. Reciprocating saws are sometimes referred to as recip saws, jig saws, and portable power hack saws, and the term reciprocating saw is used herein without limitation to mean reciprocating saw machines, jigsaw machines, and portable power hack machines. Reciprocating saws are typically driven by electric motors (e.g., cord or cordless saws) or are pneumatically driven. Well-known reciprocating saws are sold under the brand names "Sawzall™" by Milwaukee Electric Tool Corporation and "Tiger Saw™" by Porter-Cable Corporation.

A typical reciprocating saw blade includes a blade portion having a cutting edge defined by a plurality of teeth axially spaced relative to each other along one side of the blade, and a non-working edge formed on an opposite side of the blade relative to the cutting edge. A tang for releasably connecting the blade to the chuck of a reciprocating saw extends from an inner end of the blade. The term "recip blade" or "reciprocating saw blade" is used herein to mean a blade configured for use in a reciprocating saw.

As shown in FIG. 1, a typical prior art recip blade exhibits a tooth form defining a tip 1, a rake face 2 located on one side of the tip, and a primary clearance surface 3 located on an opposite side of the tip 1 relative to the rake face 2 defining a primary clearance angle 4, and a secondary clearance surface 5 defining a secondary clearance angle 6. As can be seen, the secondary clearance angle 6 is steeper than the primary clearance angle 4. In order to cut faster, some such prior art recip blades define relatively steep primary clearance angles, e.g., about 35° or greater. As a general matter, the steeper the clearance angle, the more sharply pointed is the tooth form, and the faster is the speed of cut but the shorter the lifespan of the tooth. One drawback associated with such prior art recip blades is that the teeth defining such steep clearance angles are relatively weak, and thus prone to premature fracture or rounding, particularly when subjected to abusive cutting applications, such as in demolition applications where cuts are made through multiple work pieces and/or multiple materials or layers of materials, such as cutting pipes or interrupted cuts of hard objects that are embedded within softer materials, like nail embedded wood, nail or screw embedded sheetrock, or plaster bonded to metal or wood lath.

Some prior art attempts to improve the performance of recip blades in such abusive cutting applications have involved increasing the thickness of the blade (i.e., the thickness of the blade body, including the thickness of the cutting teeth). For example, some recip blades define a thickness of about 0.062 inch, which is significantly thicker as compared to typical recip blades that define a thickness of about 0.05 inch. Generally, thicker blades better resist bending and twisting, which commonly occurs during abusive cutting applications. In addition, thicker teeth are more robust and are thereby suited to better handle the greater loads and stresses created during abusive cutting applications. However, although beneficial, thicker recip blades have not satisfactorily addressed the problem of premature tooth breakage and wear in abusive cutting applications.

Other prior art attempts to improve the performance of recip blades have been directed at solving the problem of premature tooth fracture and/or wear. Such prior art attempts include using different height and set styles wherein multiple teeth are set to the same height and set position to reinforce the teeth of like height and set. Although helpful, this feature has not satisfactorily addressed the problem. Another attempt to solve the problem of premature tooth fracture involves employing high-low set and/or unset teeth of varying primary and secondary clearance angles. For example, some prior art recip saw blades have recurring patterns of groups of teeth wherein each group includes a tooth with a relatively high tip, sometimes being an unset or raker tooth, and a tooth with a relatively low tip, sometimes being a set tooth, wherein the high teeth and low teeth have different primary clearance angles.

Conventional wisdom generally has taught away from such high teeth having relatively steep primary clearance angles, or even relatively shallow angles that are steeper than the primary clearance angles of the low teeth, because the relatively high teeth are the dominant teeth and the life of the blade is linked primarily to the dominant teeth. See, for example, U.S. Patent Publication No. 2008/0307936, which is incorporated by reference in its entirety as part of the present disclosure. According to conventional wisdom, if the high teeth include relatively steep primary clearance angles, or at least relatively shallow angles that are steeper than the primary clearance angles of the low teeth (e.g., about 23° or greater), the high teeth become overly exposed and subjected to excessive cutting forces during abusive cutting applications, and thus subject to fracture, chipping and/or wear. Similarly, because the low teeth are more robust, if they include relatively steeper primary clearance angles than that of the high teeth, the low teeth tend to fracture and break off the blade. However, although relatively shallow primary clearance angles of high teeth, such as angles that are shallower than that of the low teeth (e.g., less than about 23°), provide increased strength to resist tooth breakage, such high teeth tend to quickly wear and become dull during abusive cutting applications, thereby shortening the life span of the blade in such applications. As a result, the performance of prior art recip blades, such as cutting life and/or durability, has not always been at levels desired for abusive cutting applications.

Accordingly, it is an object of the present invention to overcome one or more of the above-described drawbacks and/or disadvantages of the prior art.

SUMMARY OF THE INVENTION

In accordance with a first aspect, a recip blade comprises a recip blade body and a cutting edge extending along the recip blade body that includes a plurality of teeth. Each of a plurality of the teeth includes a primary clearance surface defining a relatively shallow primary clearance angle and a secondary clearance surface defining a relatively steep secondary clearance in comparison to the primary clearance surface.

In some embodiments, the cutting edge is defined by a repeating pattern of teeth, and at least one tooth of the repeating pattern is a low tooth that includes a primary clearance surface defining a relatively shallow primary clearance angle and a secondary clearance surface defining a relatively steep secondary clearance angle in comparison to the primary clearance surface, and at least one other tooth of the repeating pattern is a high tooth that includes a primary clearance surface defining a relatively shallow primary clearance angle that is steeper as compared to the primary clearance angle of the low tooth and a secondary clearance surface defining a relatively steep secondary clearance angle in comparison to the primary clearance surface.

In some embodiments, each of the high teeth includes a primary clearance surface defining a relatively shallow primary clearance angle within a range of about 23° to about 28°, and the primary clearance angle of the high teeth is steeper than the primary clearance of the low teeth. In some embodiments, the primary clearance angle of the low teeth is within a range of about 17° to about 25°. In some embodiments, the secondary clearance angle of the high teeth is within a range of about 38° to about 45°, and the secondary clearance angle of the low teeth is within a range of about 40° to about 50°. In some embodiments, the secondary clearance angle of the low teeth is steeper than the secondary clearance angle of the high teeth.

In other embodiments, the primary clearance angle of the high teeth is within a range of about 25° to about 27°. In yet other embodiments, the primary clearance angle of the low teeth is within a range of about 19° to about 23°, the secondary clearance angle of the high teeth is about 40°, and the secondary clearance angle of the low teeth is about 45°.

In some embodiments, the difference in height between the high teeth and the low teeth is within a range of about 0.002 inch to about 0.010 inch prior to any tooth set. In some embodiments, the teeth define a pitch of about 5 to about 10 teeth-per-inch. In other embodiments, the teeth define a pitch of about 6 teeth-per-inch.

In some embodiments, the repeating pattern of teeth defines a plurality of set teeth including at least one first set tooth set to a first set direction and at least one second set tooth set to a second set direction different the first set direction. In some such embodiments, the repeating pattern of teeth defines at least one relatively light first set tooth set to a relatively light first set magnitude, at least one relatively heavy first set tooth set to a relatively heavy first set magnitude, at least one relatively light second set tooth set to a relatively light second set magnitude, and at least one relatively heavy second set tooth set to a relatively heavy second set magnitude. In some such embodiments, at least one of the at least one relatively light first set tooth set to a relatively light first set magnitude and at least one relatively heavy first set tooth set to a relatively heavy first set magnitude are set to the first set direction, and at least one of the at least one relatively light second set tooth set to a relatively light second set magnitude and at least one relatively heavy second set tooth set to a relatively heavy second set magnitude are set to the second set direction. In some such embodiments, the repeating pattern of teeth defines a leading light first set tooth, a heavy first set tooth trailing the light first set tooth, a light second set tooth trailing the heavy first set tooth, and a heavy second set tooth trailing the light second set tooth. In some such embodiments, the leading light first set tooth and the heavy first set tooth trailing the light first set tooth are set to the first set direction, and the light second set tooth trailing the heavy first set tooth and the heavy second set tooth trailing the light second set tooth are set to the second set direction. In some such embodiments, the high teeth are light set and the low teeth are heavy set.

In some embodiments, the repeating pattern of teeth defines at least one unset tooth. In some such embodiments, the repeating pattern of teeth defines a leading unset tooth, a first set tooth trailing the leading unset tooth, a second unset tooth trailing the first set tooth, and a second set tooth trailing the second unset tooth. In some such embodiments, the unset teeth are high teeth and the first and second set teeth are low teeth.

In some embodiments, the blade body and cutting edge define a thickness greater than about 0.05 inch. In some such embodiments, the thickness of the blade body and cutting edge is about 0.062 inch.

In accordance with another aspect, a recip blade includes a recip blade body and a cutting edge extending along the recip blade body. The cutting edge includes a repeating pattern of teeth including two consecutive bi-metal teeth defining a pitch of about 10 teeth-per-inch or less. The two consecutive teeth include a high tooth and a relatively low tooth in comparison to the high tooth. Each of the high teeth includes first means for increasing the blade's life span during abusive cutting operations and second means for imparting toughness to the high teeth. Each of the low teeth includes a primary clearance surface defining a relatively shallow primary clearance angle within a range of about 17° to about 25° and a secondary clearance surface defining a relatively steep secondary clearance angle in comparison to the primary clearance surface within a range of about 40° to about 50°.

In some embodiments, the first means is a primary clearance surface defining a relatively shallow primary clearance angle that is steeper than the primary clearance angle of the low teeth, and the second means is a secondary clearance surface defining a relatively steep secondary clearance angle in comparison to the primary clearance surface within a range of about 38° to about 45°. In some such embodiments, the primary clearance angle of the high teeth is within a range of about 23° to about 28°. In some such embodiments, the primary clearance angle of the high teeth is within a range of about 25° to about 27°, the primary clearance angle of the low teeth is within a range of about 19° to about 23°, the secondary clearance angle of the high teeth is about 40°, and the secondary clearance angle of the low teeth is about 45°. In some embodiments, the high teeth are either set or unset, and the low teeth are set.

In accordance with another aspect, a recip blade includes a recip blade body and a generally linear cutting edge extending along the recip blade body. The blade body and cutting edge have a thickness of greater than about 0.05 inch. The cutting edge is defined by a repeating pattern of teeth including two consecutive bi-metal teeth defining a pitch of about 10 teeth-per-inch or less without any other teeth located between adjacent groups of the two consecutive teeth The two consecutive teeth include a high tooth and a relatively low tooth in comparison to the high tooth. Each high tooth and each low tooth include a primary clearance surface that defines a relatively shallow primary clearance angle of about 28° or less and a secondary clearance surface that defines a relatively steep secondary clearance angle in comparison to the primary clearance surface. The primary clearance angle of each high tooth is steeper than the primary clearance angle of each low tooth, the secondary clearance angle of each high tooth is within a range of about 38° to about 45°, and the secondary clearance angle of each low tooth is within a range of about 40° to about 50°.

In some embodiments, the primary clearance angle of each high tooth is within a range of about 23° to about 28°, and the primary clearance angle of each low tooth is within a range of about 17° to about 25°. In some embodiments, the primary clearance angle of each high tooth is within a range of about 25° to about 27°, the primary clearance angle of each low tooth is within a range of about 19° to about 23°, the secondary clearance angle of each high tooth is about 40°, and the secondary clearance angle of each low tooth is about 45°. In some embodiments, the thickness of the blade body and cutting edge is about 0.062 inch.

One advantage of the recip blades of the present invention is that they have practical applicability in relatively abusive cutting applications, such as in demolition when cutting nail embedded wood. For example, features of the present invention are suitable for use in connection with recip blades that are relatively thick and define a relatively coarse tooth pitch, such as blades that define a thickness that is greater than about 0.05 inch (e.g., about 0.062 inch) and a tooth pitch of 10 teeth-per-inch (TPI) or coarser (e.g., 9, 8, 7, 6 and 5 TPI, and other similarly coarse pitches, such as ⅝, 6/10, ⅝ etc.). A further advantage of the recip blades of the invention is that they can withstand the large forces encountered in abusive cutting applications, such as demolition applications involving cutting nail embedded wood, while also exhibiting long life in such abusive cutting applications. Unexpectedly, where the primary clearance angles of both the high and low teeth are relatively shallow (e.g., 30° or less) and the primary clearance angle of the high teeth is steeper than the primary clearance angle of the low teeth, the blade is both sufficiently strong to handle the large forces encountered during abusive cutting operations and resists wear to thereby increase the wear life of the blade in such abusive applications.

Other objects and advantages of the present invention, and/or of embodiments thereof, will become more readily apparent in view of the following detailed description of exemplary embodiments and the accompanying drawings.

BRIEF DESCRIPTION OF THE DRAWINGS

FIG. 3 is a partial, top elevational view of the recip blade of FIG. 1 illustrating a first set pattern.

FIG. 4 is a partial, top elevational view of another embodiment of a saw blade illustrating a second set pattern.

DETAILED DESCRIPTION OF THE EMBODIMENTS OF THE INVENTION

Figure 1:
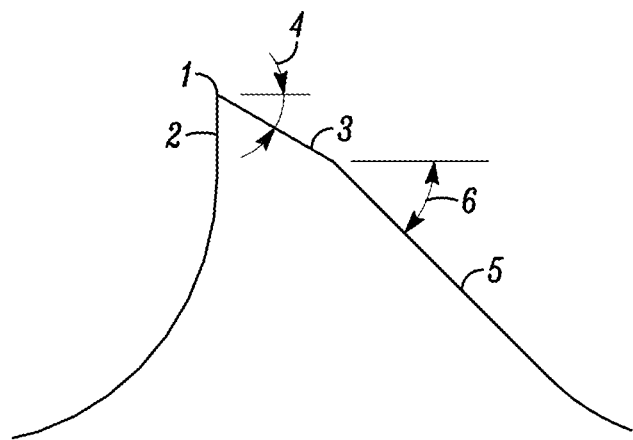
FIG. 1 is a side elevational view of a prior art recip blade tooth form.
Figure 2:
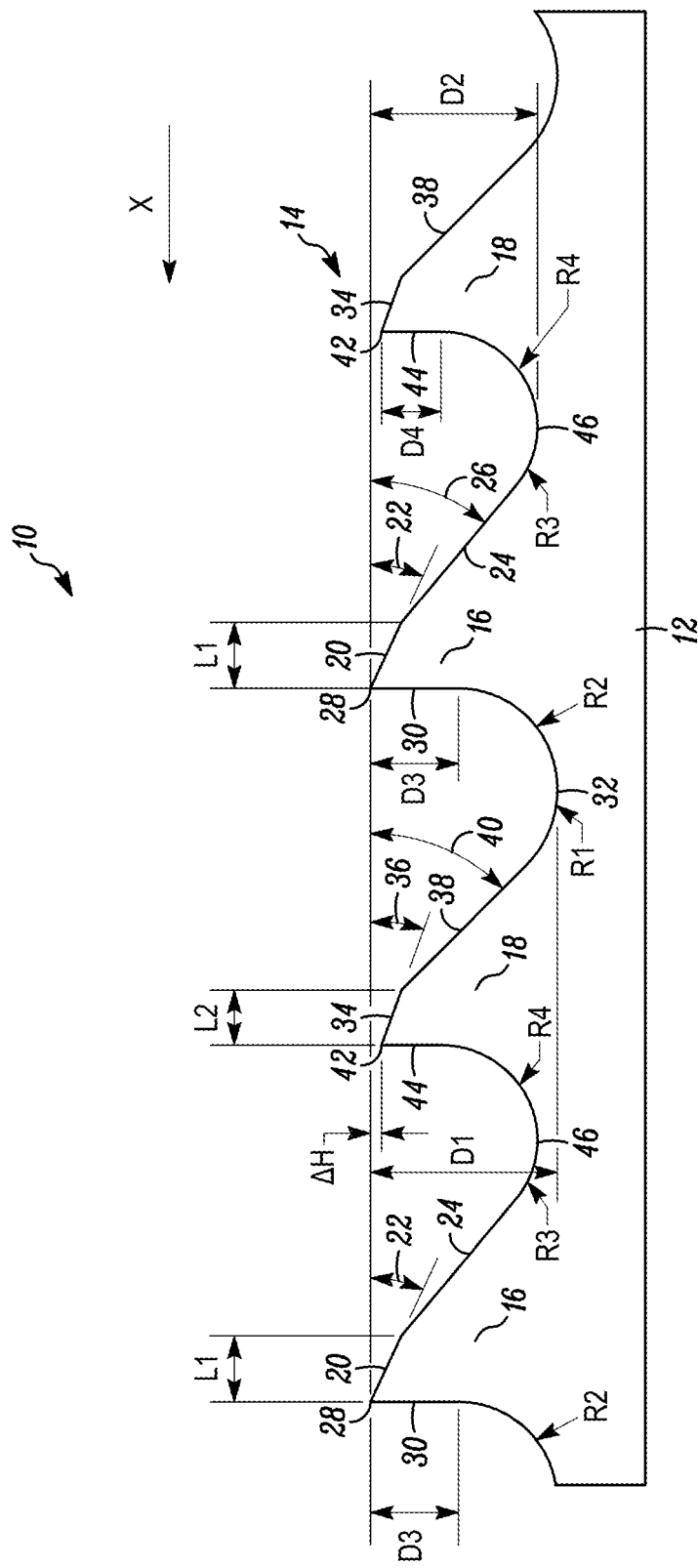
FIG. 2 is partial, side elevational view of a saw blade, such as a recip blade.
Figure 5:
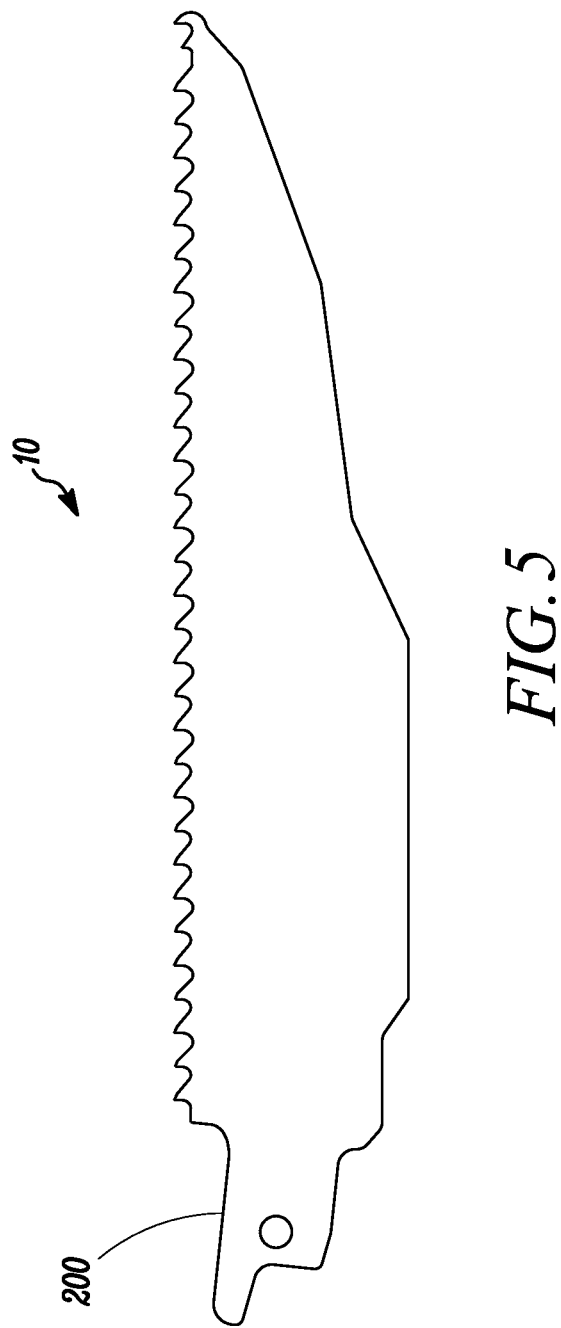
FIG. 5 is a side view of an embodiment of a saw blade having a tang at one end for chucking in a chuck of a recip saw.

In FIG. 2, a saw blade is indicated generally by the reference numeral 10. The saw blade 10 comprises a blade body 12 and a cutting edge 14 extending along the blade body 12 and defined by a repeating pattern of two consecutive teeth. The first tooth 16 of the repeating pattern of two consecutive teeth, in reference to the cutting direction "x" of the blade 10, defines a height that is greater than the height of the subsequent second tooth 18. The first or high tooth 16 defines a primary clearance surface 20 defining a relatively shallow primary clearance angle 22, a secondary clearance surface 24 defining a relatively steep secondary clearance angle 26 compared to the primary clearance surface, a tip 28, a rake face 30 located on the opposite side of the tip 28 relative to the primary clearance surface 20, a gullet 32 defining a depth D1, a first gullet radius R1 located on an opposite side of the gullet 32 relative to the rake face 30, and a second gullet radius R2 located between the gullet 32 and the rake face 30. Similarly, the second or low tooth 18 defines a primary clearance surface 34 defining a relatively shallow primary clearance angle 36, a secondary clearance surface 38 defining a relatively steep secondary clearance angle 40 compared to the primary clearance surface, a tip 42, a rake face 44 located on the opposite side of the tip 42 relative to the primary clearance surface 34, a gullet 46 defining a depth D2, a third gullet radius R3 located on an opposite side of the gullet 46 relative to the rake face 44, and a fourth gullet radius R4 located between the gullet 46 and the rake face 44.

As shown in FIG. 2, the depth D1 of the gullet 32 of each high tooth 16 is greater than each of the first gullet radius R1 and the second gullet radius R2, and the second gullet radius R2 is greater than the first gullet radius R1. In the illustrated embodiment, depth D1 of the gullet 32 of the high tooth 16 is about 0.09 inch, the first gullet radius R1 is about 0.04 inch and the second gullet radius R2 is about 0.05 inch. Similarly, the depth D2 of the gullet 46 of each of the low teeth 18 is greater than each third gullet radius R3 and each fourth gullet radius R4, and the fourth gullet radius R4 is greater than the third gullet radius R3. In the illustrated embodiment, depth D2 of the gullet 46 of the low tooth 18 is about 0.08 inch, the third gullet radius R3 is about 0.03 inch and the fourth gullet radius R4 is about 0.05 inch. As may be recognized by those of ordinary skill in the pertinent art based on the teachings herein, the gullet depths and radii disclosed herein are only exemplary and other depths and radii equally may be employed.

Each high tooth 16 defines a rake face depth D3 that is greater than the rake face depth D4 of each low tooth 18. In the illustrated embodiment, the rake face depth D3 of each high tooth 16 is about 0.04 inch, and the rake face depth D4 of each low tooth 18 is about 0.03 inch. Each high tooth 16 also defines a primary clearance length L1, which is defined by the length of the respective primary clearance surface measured along an axis defined by the cutting direction "x", that that is greater than the primary clearance length L2 of each low tooth 18. In the illustrated embodiment, the primary clearance length L1 of each high tooth 16 is about 0.03 inch, and the primary clearance length L2 of each low tooth 18 is about 0.025 inch. As may be recognized by those of ordinary skill in the pertinent art based on the teachings herein, the rake face depths and primary clearance lengths disclosed herein are only exemplary and other depths or lengths equally may be employed.

As shown in FIG. 2, contrary to conventional wisdom of recip blades with high-low teeth defining relatively shallow clearance angles (e.g., less than about 30°), the primary clearance angle 22 of the primary clearance surface 20 of each high tooth 16 is steeper than the primary clearance angle 36 of the primary clearance surface 34 of each low tooth 18. Further, although the primary clearance angle 22 of each high tooth 16 is relatively shallow (e.g., less than about 30°) to provide sufficiently strong high or dominant teeth that are capable of withstanding the forces generated in abusive cutting application, they are also steeper than conventional wisdom (e.g., at least about 23°) to unexpectedly increase wear life of the blade in such abusive cutting applications. For example, and without limitation, each primary clearance angle 22 of the high teeth 16 can be within the range of about 23° to about 30°, such as within the range of about 23° to about 28°, and even within the range of about 25° to about 27°. Such configurations increase the blade's life span during abusive cutting applications. In the illustrated embodiment shown in FIG. 2, the primary clearance angle 22 of the high teeth 16 is about 25°. By way of example only, each primary clearance angle 36 of the low teeth 18 can within the range of about 17° to about 25°, such as within the range of about 19° and 25°. In the illustrated embodiment shown in FIG. 2, the primary clearance angle 36 of the low teeth 18 is about 20°.

As also shown in FIG. 2, the secondary clearance angle 26 of each high tooth 16 is shallower than the secondary clearance angle 40 of each low tooth 18. For example, the secondary clearance angle 26 of each high tooth 16 can be within the range of about 38° to about 45°, and the secondary clearance angle 40 of each low tooth 18 can be within the range of about 40° to about 50°. Such configurations impart toughness to the teeth. In the illustrated embodiment shown in FIG. 2, the secondary clearance angle 26 of the high teeth 16 is about 40°, and the secondary clearance angle 40 of the low teeth 18 is about 45°.

As also shown in FIG. 2, each high tooth 16 defines a height that is greater than the height of the low tooth prior to any tooth set, i.e., the tip 28 of the high tooth 18 is higher than the tip 42 of the low tooth 16 prior to any tooth set. As a non-limiting example, the difference in height "Δh" between the high teeth 16 and low teeth 18 prior to any tooth set can be within the range of about 0.002 inch to about 0.010 inch, such as within the range of about 0.002 inch to about 0.008 inch, and even within the range of about 0.003 inch to about 0.005 inch. In the illustrated embodiment, the difference in height "Δh" between the high teeth 16 and low teeth 18 prior to any tooth set is about 0.005 inch. One advantage of the saw blades of the present invention is that, contrary to conventional wisdom, each high tooth includes a relatively shallow primary clearance angle (e.g., about 28° or less) that is steeper as compared to the primary clearance angle of the low teeth (e.g., about 23° or less), which provides both sufficient blade strength and long blade life in abusive cutting applications.

In some embodiments of the recip blade 10, the tang 200 has an "attack angle" or "tang angle". A tang angle within the range of about 3° to about 7°, such between about 6° to about 7°, is contemplated, but the invention is not limited to such angles. One advantage of this feature is that it causes the teeth 14, 16 of the blade 10 to enter the work piece at an angle different than that otherwise defined by the plane of the tooth tips 28, 42 (or the plane defined by the tips of the unset teeth). This allows the blade 10 to remain aggressive with deep penetration in the cut for more efficient cutting. In addition, the high and low tooth forms 16, 18 of the invention permit such an aggressive tang angle while substantially preventing the premature tooth fracture and wear that otherwise might be associated with such an aggressive tang angle in abusive or other demanding applications. Also in the illustrated embodiments, the repeating pattern is defined by repeating pairs of the consecutive high-low teeth 16, 18 without any other teeth located therebetween. The repeating pattern of two consecutive teeth (high tooth 16 and low tooth 18) defines a pitch. By way of example only, the pitch can be equal to about 10 teeth-per-inch (TPI) or coarser, e.g., 10, 8, 7, 6 and 5 TPI, and other similarly coarse pitches, such as 5/8, 6/10, 6/8, etc. In the illustrated embodiment shown in FIG. 2, the cutting edge 14 defines a pitch of about 6 TPI. These relatively coarse pitches are particularly suitable for recip blades for cutting wood and/or for demolition applications, such as for cutting pipe or nail embedded wood or sheet rock with screws or nails. However, as may be recognized by those of ordinary skill in the pertinent art based on the teachings herein, these pitches are exemplary and other pitches equally may be employed.

As shown in FIG. 3, the blade 10 is a relatively thick blade (e.g., the thickness "t" of the blade body 12 and the cutting edge 14 is greater than about 0.035 inch). For example, the thickness "t" of the blade 10 is within the range of about 0.05 inch to about 0.08 inch, such as within the range of about 0.055 inch to about 0.070 inch, and is even within the range of about 0.058 inch to about 0.066 inch. In the illustrated embodiment, the thickness "t" of the blade 10 is about 0.062 inch. The relatively high thickness "t" of the blade 10 makes the blade 10 robust and particularly well suited for abusive cutting applications where forces that tend to bend and twist of the blade are common and where the cutting edge is subjected to relatively high loads and stresses.

As also shown in FIG. 3, the saw blade 10 includes a set pattern where a first pair of the high teeth 16 and the low teeth 18 are set in a first set direction, such as the "left" set direction, and the subsequent pair of the high teeth 16 and the low teeth 18, in respect to the cutting direction "x", are set to a second set direction opposite the first set direction, such as the "right" set direction. The "left" set direction is located to the left side of the blade 10 when viewed from a direction opposing the cutting direction "x" of the saw blade 10, and the "right" set direction is located to the right side of the blade 10 when similarly viewed. As shown in FIG. 3 and with respect to the cutting direction "x" of the blade 10, the set pattern of the blade 10 defines a relatively light left set magnitude (i.e., "light left") to the leading high tooth 16 of the first pair, a relatively heavy left set magnitude (i.e., "heavy left") to the low tooth 18 of the first pair, a relatively light right set magnitude (i.e., "light right") to the high tooth 16 of the subsequent pair, and a relatively heavy right set magnitude (i.e., "heavy right") to the low tooth 18 of the subsequent pair. Accordingly, the repeating pattern of two consecutive teeth (a high tooth 16 and a low tooth 18) of the saw blade 10 has a four tooth set pattern/two tooth mill pattern defined by a leading high light left set tooth 16, a low heavy left set tooth 18 trailing the high light left set tooth 16, a high light right set tooth 16 trailing the low heavy left set tooth 18, and a low heavy right set tooth 18 trailing the high light right set tooth 16. Therefore, the tips of the heavy set teeth are lower than the tips of the light set teeth.

In FIG. 4, another saw blade is indicated generally by the reference numeral 110. The saw blade 110 is substantially the same as the saw blade 10 described above with reference to FIGS. 2 and 3, and therefore like reference numerals preceded by the numeral "1" are used to indicate like elements. The tooth forms of the saw blade 110 are the same as the saw blade 10, and therefore the illustration of FIG. 2 and the associated detailed description equally apply to the saw blade 110 of FIG. 4. The saw blade 110 differs from the saw blade 10 with respect to the set pattern. In blade 110, the high teeth 116 are unset teeth and the low teeth 118 are set teeth. As shown in FIG. 4 and with respect to the cutting direction "x" of the blade 110, the repeating pattern of two consecutive teeth defines a leading high unset tooth 116, a low right set tooth 118 trailing the leading high unset tooth 116, another high unset tooth 118 trailing the low right set tooth 118, and a low left set tooth 118 trailing the second high unset tooth 116. Accordingly, the repeating pattern of consecutive high teeth 116 and low teeth 18 of the saw blade 110 has a four tooth set pattern/two tooth mill pattern defined by a leading high unset tooth 116, a low right set tooth 118 trailing the leading high unset tooth 116, a second high unset tooth 116 trailing the low right set tooth 118, and a low left tooth 118 trailing the second high unset tooth 116.

Another advantage of the particular primary clearance angles of the high teeth, especially in relation to the primary clearance angles of the low teeth, is that they can provide significantly improved performance in comparison to prior art saw blades, including improved blade life, when used in abusive cutting applications, such as in demolition applications where cuts are made through multiple work pieces and/or materials. As summarized in the table below, recip saw blades embodying the present invention were tested against similar blades with differing primary clearance angles.

In the first two tests, a group A of four blades embodying the present invention that were substantially similar to the blade 10 described above in connection with FIGS. 2 and 3, were tested against three other groups B, C, and D of four blades that included different primary clearance angles as compared to the primary clearance angles of the blades of group A, but were otherwise substantially similar to the blades of group A. Each of the blades of groups A-D were about 6 inches long, about ⅞ inch wide, about 0.062 inch thick, included a tang angle of about 6.2°, define a tooth pitch of about 6 TPI, and had an overall set (the distance between the outermost edges of teeth that are set to opposite sides of the blade and include the greatest amount of set) of about 0.086 inch. The high teeth 16 of the blades of group A (the blades embodying the current invention) included a 25° primary clearance angle and a 40° secondary clearance angle, and the low teeth 18 included about a 20° primary clearance angle and about a 45° secondary clearance angle. In comparison, the primary clearance angle of the high and low teeth of the blades of group B were both about 20°, the primary clearance angle of the high teeth was 20° and the primary clearance angle of the low teeth was about 25° of the blades of group C, and the primary clearance angle of high and low teeth of the blades of group D were both about 25°.

In the first test, the blades of groups A, B, C and D were used to cut the same material (2 inch diameter schedule 40 black pipe), at a recip saw speed of about 1500 strokes per minute ("SPM"), under a blade down force of about 30 lbs. Each blade was deemed to have reached its failure mode after either (i) three consecutive cuts averaging 120 seconds, or (ii) one cut above 150 seconds. The following test data was generated:

| Blade Group (Five Blades) | High Tooth Primary Clearance Angle | Low Tooth Primary Clearance Angle | Average No. of Cuts Until Failure | Average Cut Time (First Cut) |
| --- | --- | --- | --- | --- |
| A | 25 | 20 | 24.0 | 16.8 |
| B | 20 | 20 | 11.0 | 22 |
| C | 20 | 25 | 16.5 | 18.9 |
| D | 25 | 25 | 17.8 | 16.8 |

As can be seen, group A, the blades embodying the present invention, unexpectedly provided substantially improved blade life (by about 45%) in comparison to the comparable blades with that included the larger primary clearance angle on the low teeth (group C). Another advantage of the blades of this configuration (group A) is that they also outperformed comparable blades that had the same primary clearance angles on the high and low teeth (groups B and D). Yet another advantage of the blades of this configuration (group A) is that they had comparable, if not improved, cutting times to the cutting times of the blades of group B, C and D (i.e., cutting times were not compromised).

In the second test, the blades if groups A, B, C and D were used to cut the same material (a wood 2×4 with stainless steel and carbon nails embedded therein), at a recip saw speed of about 1250 SPM, under a blade down force of about 30 lbs. Each blade was deemed to have reached its failure mode after either (i) three consecutive cuts averaging 60 seconds, or (ii) one cut above 90 seconds. The following test data was generated:

| Blade Group (Five Blades) | High Tooth Primary Clearance Angle | Low Tooth Primary Clearance Angle | Average No. of Cuts Until Failure | Average Cut Time (First Cut) |
| --- | --- | --- | --- | --- |
| A | 25 | 20 | 41.5 | 15.8 |
| B | 20 | 20 | 18.8 | 14.5 |
| C | 20 | 25 | 34.0 | 15.8 |
| D | 25 | 25 | 31.0 | 14.0 |

As can be seen, just as in the first test, the blades of this configuration (group A), unexpectedly provided substantially improved blade life (over 20% better) in comparison to the comparable blades that included larger primary clearance angles on the low teeth as compared to the high teeth (group C). Another advantage of the blades of this configuration (group A) is that they also outperformed comparable blades that had equal primary clearance angles on the high and low teeth (groups B and D). Yet another advantage of the blades (group A) is that they had comparable cutting times to the cutting times of the blades of groups B, C and D (i.e., cutting times were not compromised).

In the third and fourth tests, a group E of four blades embodying the present invention that were substantially similar to the blade 10 described above in connection with FIGS. 2 and 3, but were relatively thin (e.g., about 0.05 inch thick), were tested against three other groups F, G, H of four blades that included different primary clearance angles as compared to the primary clearance angles of the blades of group E, but were otherwise substantially similar to the blades of group E. Each of the blades of groups E-H were about 6 inches long, about ¾ inch wide, about 0.05 inch thick, included a tang angle of about 6.5°, defined a tooth pitch of about 6 TPI, and had an overall set of about 0.07 inch. The high teeth 16 of the blades of group E included a 27° primary clearance angle and a 40° secondary clearance angle, and the low teeth 18 included about a 20° primary clearance angle and about a 45° secondary clearance angle. The primary clearance angle of the high and low teeth of the blades of group F were both about 20°, the primary clearance angle of the high teeth was 20° and the primary clearance angle of the low teeth was about 27° of the blades of group G, and the high and low teeth of the blades of group H were both about 27°

In the third test, the blades of groups E, F, G, and H were used to cut the same material (1 inch diameter schedule 40 black pipe), at a recip saw speed of about 1500 SPM, under a blade down force of about 25 lbs. Each blade was deemed to have reached its failure mode after either (i) three consecutive cuts averaging 45 seconds, or (ii) one cut above 60 seconds. The following test data was generated:

| Blade Group (Five Blades) | High Tooth Primary Clearance Angle | Low Tooth Primary Clearance Angle | Average No. of Cuts Until Failure | Average Cut Time (sec) (First Five Cuts) |
| --- | --- | --- | --- | --- |
| E | 27 | 20 | 183.2 | 7.7 |
| F | 20 | 20 | 102.6 | 7.9 |
| G | 20 | 27 | 136.0 | 8.3 |
| H | 27 | 27 | 229.2 | 7.5 |

As can be seen, even when the blades embodying this configuration (group E) are relatively thin blades (e.g., about 0.05 inch thick, rather than about 0.062 inch thick), they still unexpectedly provided substantially improved blade life (by about 35%) in comparison to the comparable blades that included a larger primary clearance angle on the low teeth (group G). Another advantage of the blades of this configuration (group E), even when they are relatively thin, is that they outperformed comparable blades that had equal primary clearance angles on the high and low teeth of about 20° (group F). Yet another advantage of the blades of this configuration (group E), even when they are relatively thin, is that they had comparable, if not improved, cutting times to the cutting times of the blades of group F, G and H (i.e., cutting times were not compromised).

In the fourth test, the blades of groups E, F, G and H were used to cut the same material (a wood 2×4 with stainless steel and carbon nails embedded therein), at a recip saw speed of about 1500 SPM, under a blade down force of about 30 lbs. Each blade was deemed to have reached its failure mode after either (i) three consecutive cuts averaging 60 seconds, or (ii) one cut above 90 seconds. The following test data was generated.

| Blade Group (Five Blades) | High Tooth Primary Clearance Angle | Low Tooth Primary Clearance Angle | Average No. of Cuts Until Failure | Average Cut Time (sec) (First Five Cuts) |
|---|---|---|---|---|
| E | 27 | 20 | 30.4 | 24.4 |
| F | 20 | 20 | 32.0 | 24.4 |
| G | 27 | 20 | 36.8 | 23.0 |
| H | 27 | 27 | 50.6 | 28.8 |

As can be seen from the results of this test, especially in comparison to the results of the blades of group A of the second test, the blades of this configuration (group E) provide greater advantages for thicker recip blades (e.g., 0.062 inch thick blades as compared to 0.05 inch thick blades) when cutting nail embedded wood. As explained above, since demolition type recip blades (the blades commonly used for cutting nail embedded wood) are usually relatively thick blades, the blades embodying this configuration (group E) are particularly advantageous as blades designed for abusive cutting applications.

The term "recip" or "recip blade(s)" is used herein to mean any saw blade that is designed to cut when driven in a reciprocating motion by a power tool (e.g., in an orbital, linear and/or angled cutting action), including without limitation power tools that are known generally as "reciprocating saws," such as the Sawzall™ sold by Milwaukee Electric Tool Corp and the Tiger Saw™ sold by Porter-Cable Corporation, as well as blades utilized in jig saw machines, blades used in air saw machines, and blades used in portable power hack machines.

It should also be understood that the term "about" and like terms used herein when referring to a dimension or characteristic of blades of the invention indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

As may be recognized by those of ordinary skill in the pertinent art based on the teachings herein, numerous changes and modifications may be made to the above-described and other embodiments without departing from the scope of the invention as defined in the appended claims. For example, in some embodiments the teeth are carbide tipped; however, the teeth also may define any of numerous different constructions that are currently known, or that later become known, including bi-metal or other constructions. Further, the saw blades of the present invention may be coated with any of numerous different coatings that are currently known or that later become known, such as a titanium nitride coating (TiN), aluminum titanium nitride (AlTiN), or combinations thereof, or the saw blades may not include any coating at all. As another example, the tooth forms may differ from the tooth forms described herein, certain tooth forms may be removed, other different tooth forms may be added, and/or the teeth of the repeating pattern may all define the same tooth form, such as a straight-backed tooth form that defines a single clearance surface, or a tooth form that defines three or more clearance surfaces. Similarly, the teeth may define different pitches, different set patterns, and different combinations of set patterns and tooth heights than described herein. For example, the teeth need not define any height differentials and/or the teeth may define varying degrees of set magnitude (including heavy and light sets as illustrated herein, and other degrees of set). As another example, the high teeth may include a relatively heavy set magnitude and the low teeth may define a relatively light set magnitude as compared to the high teeth. Similarly, the rake face of the teeth may be vertical (i.e., 0° rake) or define a rake angle (e.g., a positive or negative rake angle). As another example, the teeth may be arranged at a variable pitch or a constant pitch. As another example, any other clearance angles, tooth heights, gullet radii and rake face depths that are known, or that later become known, and different than those described herein equally may be employed. In addition, although the saw blades described herein are recip blades, the invention may find applicability to other types of saw blades that are currently known, or that later become known, such as hole saws or hole cutters. As another example, the blade may include the features described above, but such features may be dimensioned smaller or larger than the dimensions disclosed herein. Accordingly, this detailed description of the illustrative embodiments is to be taken in an illustrative, as opposed to a limiting sense.

What is claimed is:

1. A recip blade, comprising:
   a recip blade body having a tang at only one end thereof for chucking only said one end of the recip blade, said tang configured to engage with a chuck of a reciprocating saw configured to reciprocate the recip blade in a reciprocating stroke or motion having a length of no more than about 1½ inches; and
   a cutting edge extending along the recip blade body,
   wherein the cutting edge includes a repeating pattern of teeth including two consecutive teeth defining a pitch of 10 teeth-per-inch or less, the two consecutive teeth include a high tooth and a relatively low tooth in comparison to the high tooth, each of the high teeth includes a tip, a rake face located on one side of the tip, a primary clearance surface extending from the tip on an opposite side of the tip relative to the rake face and defining a relatively shallow primary clearance angle at the tip within a range of 25° to 27°, and a secondary clearance surface extending from the primary clearance surface on an opposite side of the primary clearance surface relative to the tip and defining a relatively steep secondary clearance angle in comparison to the primary clearance surface, each of the low teeth includes a tip, a rake face located on one side of the tip, a primary clearance surface extending from the tip on an opposite side of the tip relative to the rake face and defining a relatively shallow primary clearance angle within a range of 19° to 23°, and a secondary clearance surface extending from the primary clearance surface on an opposite side of the primary clearance surface relative to the tip and defining a relatively steep secondary clearance angle in comparison to the primary clearance surface.

2. A recip blade as defined in claim 1, wherein the high tooth and the low tooth have a same rake angle.

3. A recip blade as defined in claim 1, wherein the secondary clearance angle of the high teeth is within a range of 38° to 45°, and the secondary clearance angle of the low teeth is within a range of 40° to 50°.

4. A recip blade as defined in claim 3, wherein the secondary clearance angle of the low teeth is steeper than the secondary clearance angle of the high teeth.

5. A recip blade as defined in claim 1, wherein the high tooth and the low tooth have a vertical or negative rake angle.

6. A recip blade as defined in claim 1, wherein the high tooth and the low are both set to the same direction.

7. A recip blade as defined in claim 1, wherein repeating pattern contains no unset teeth.

8. A recip blade as defined in claim 7, wherein the secondary clearance angle of the high teeth is 40° and the secondary clearance angle of the low teeth is 45°.

9. A recip blade as defined in claim 1, wherein the difference in height between the high teeth and the low teeth is within a range of 0.002 inch to 0.010 inch prior to any tooth set.

10. A recip blade as defined in claim 1, wherein the teeth define a pitch of 6 teeth-per-inch.

11. A recip blade as defined in claim 1, wherein the repeating pattern of teeth defines a plurality of set teeth including at least one first set tooth set to a first set direction and at least one second set tooth set to a second set direction different than the first set direction.

12. A recip blade as defined in claim 11, wherein the repeating pattern of teeth defines at least one relatively light first set tooth set to a relatively light first set magnitude, at least one relatively heavy first set tooth set to a relatively heavy first set magnitude, at least one relatively light second set tooth set to a relatively light second set magnitude, and at least one relatively heavy second set tooth set to a relatively heavy second set magnitude.

13. A recip blade as defined in claim 12, wherein at least one of the at least one relatively light first set tooth set to a relatively light first set magnitude and at least one relatively heavy first set tooth set to a relatively heavy first set magnitude are set to the first set direction, and at least one of the at least one relatively light second set tooth set to a relatively light second set magnitude and at least one relatively heavy second set tooth set to a relatively heavy second set magnitude are set to the second set direction.

14. A recip blade as defined in claim 13, wherein the repeating pattern of teeth defines a leading light first set tooth, a heavy first set tooth trailing the light first set tooth, a light second set tooth trailing the heavy first set tooth, and a heavy second set tooth trailing the light second set tooth.

15. A recip blade as defined in claim 14, wherein the leading light first set tooth and the heavy first set tooth trailing the light first set tooth are set to the first set direction, and the light second set tooth trailing the heavy first set tooth and the heavy second set tooth trailing the light second set tooth are set to the second set direction.

16. A recip blade as defined in claim 15, wherein the high teeth are light set and the low teeth are heavy set.

17. A recip blade as defined in claim 11, wherein the repeating pattern of teeth defines at least one unset tooth.

18. A recip blade as defined in claim 17, wherein the repeating pattern of teeth defines a leading unset tooth, a first set tooth trailing the leading unset tooth, a second unset tooth trailing the first set tooth, and a second set tooth trailing the second unset tooth.

19. A recip blade as defined in claim 18, wherein the unset teeth are high teeth and the first and second set teeth are low teeth.

20. A recip blade as defined in claim 1, wherein the blade body and cutting edge prior to any tooth set define a thickness greater than 0.05 inch.

21. A recip blade as defined in claim 20, wherein the thickness is within a range from 0.055 inch to 0.070 inch.

22. A recip blade as defined in claim 21, wherein the thickness is within a range from 0.058 inch to 0.066 inch.

23. A recip blade as defined in claim 1, wherein the two consecutive teeth are bi-metal.

24. A recip blade, comprising:
a recip blade body having a tang at only one end thereof for chucking only said one end of the recip blade, said tang configured to engage with a chuck of a reciprocating saw configured to reciprocate the recip blade in a reciprocating stroke or motion having a length of no more than about 1½ inches; and
a cutting edge extending along the recip blade body, wherein the cutting edge includes a repeating pattern of teeth including two consecutive teeth defining a pitch of 10 teeth-per-inch or less, the two consecutive teeth include a high tooth and a relatively low tooth in comparison to the high tooth, each of the high teeth includes a tip, a rake face located on one side of the tip, a primary clearance surface extending from the tip on an opposite side of the tip relative to the rake face and defining a relatively shallow primary clearance angle at the tip within a range of 25° to 27°, and a secondary clearance surface extending from the primary clearance surface on an opposite side of the primary clearance surface relative to the tip and defining a relatively steep secondary clearance angle in comparison to the primary clearance surface, each of the low teeth includes a tip, a rake face located on one side of the tip, a primary clearance surface extending from the tip on an opposite side of the tip relative to the rake face and defining a relatively shallow primary clearance angle at the tip within a range of 19° to 23°, and a secondary clearance surface extending from the primary clearance surface on an opposite side of the primary clearance surface relative to the tip and defining a relatively steep secondary clearance angle in comparison to the primary clearance surface within a range of 40° to 50°.

25. A recip blade as defined in claim 24, wherein the secondary clearance angle of the high teeth is within a range of 38° to 45°.

26. A recip blade as defined in claim 24, wherein the two consecutive teeth are bi-metal.

27. A recip blade as defined in claim 25, wherein the secondary clearance angle of the high teeth is 40°, and the secondary clearance angle of the low teeth is 45°.

28. A recip blade as defined in claim 24, wherein the high teeth are either set or unset, and the low teeth are set.

29. A recip blade as defined in claim 24, wherein the blade body and cutting edge prior to any tooth set define a thickness greater than 0.05 inch.

30. A recip blade as defined in claim 29, wherein the thickness is within a range from 0.055 inch to 0.070 inch.

31. A recip blade as defined in claim 30, wherein the thickness is within a range from 0.058 inch to 0.066 inch.

32. A recip blade, comprising:

a recip blade body having a tang at only one end thereof for chucking only said one end of the recip blade, said tang configured to engage with a chuck of a reciprocating saw configured to reciprocate the recip blade in a reciprocating stroke or motion having a length of no more than about 1½ inches, a generally linear cutting edge extending along the recip blade body, the blade body and cutting edge defining a thickness prior to any tooth set of greater than 0.05 inch, the cutting edge defined by a repeating pattern of teeth including two consecutive teeth defining a pitch of 10 teeth-per-inch or less without any other teeth located between adjacent groups of the two consecutive teeth, the two consecutive teeth include a high tooth and a relatively low tooth in comparison to the high tooth, each high tooth and each low tooth include a tip, a rake face located on one side of the tip, a primary clearance surface extending from the tip on an opposite side of the tip relative to the rake face that defines a relatively shallow primary clearance angle at the tip and a secondary clearance surface extending from the primary clearance surface on an opposite side of the primary clearance surface relative to the tip that defines a relatively steep secondary clearance angle in comparison to the primary clearance surface, the primary clearance angle of each high tooth being within a range of 25° to 27°, the primary clearance angle of each low tooth being within a range of 19° to 23°, the secondary clearance angle of each high tooth is within a range of 38° to 45°, and the secondary clearance angle of each low tooth is within a range of 40° to 50°.

33. A recip blade as defined in claim 32, wherein the thickness is within a range from 0.055 inch to 0.070 inch.

34. A recip blade as defined in claim 33, wherein the thickness is within a range from 0.058 inch to 0.066 inch.

35. A recip blade as defined in claim 32, wherein the secondary clearance angle of each high tooth is 40°, and the secondary clearance angle of each low tooth is 45°.

36. A recip blade as defined in claim 32, wherein the two consecutive teeth are bi-metal.

* * * * *